United States Patent

Ley

[15] 3,700,865
[45] Oct. 24, 1972

[54] LINEARIZING CIRCUIT FOR FREQUENCY DOMAIN TRANSDUCERS

[72] Inventor: Anthony John Ley, Farnborough, England

[73] Assignee: The Solartron Electronic Group Limited, Farnborough, England

[22] Filed: May 7, 1971

[21] Appl. No.: 141,816

[30] Foreign Application Priority Data

May 12, 1970    Great Britain ............... 23001

[52] U.S. Cl. ...... 235/150.53, 235/151.3, 235/151.34, 235/197
[51] Int. Cl. ............................................. G01f 15/02
[58] Field of Search.235/197, 151.34, 151.3, 150.53, 235/150.1

[56] References Cited

UNITED STATES PATENTS 3,610,898    10/1971    Yamamoto et al. ...235/151.34

Primary Examiner—Malcolm A. Morrison
Assistant Examiner—R. Stephen Dildine, Jr.
Attorney—William R. Sherman, Stewart F. Moore, Jerry M. Presson, Leonard R. Fellen and Roylance, Abrams, Berdo & Kaul

[57] ABSTRACT

The output of a frequency domain transducer is linearized by converting the output to a mark-space signal which changes level in one sense at each pulse (or each N'the pulse) from the transducer and in the other sense when a fixed number of clock pulses have been counted from the occurrence of the transducer pulse. The mark space signal then operates on an analogue network to effect the linearization by switching the configuration of this network. The analogue network operates either on a fixed analogue signal or an analogue signal representing a second variable when it is desired to multiply the second variable by the first variable transduced by the transducer.

11 Claims, 9 Drawing Figures

LINEARIZING CIRCUIT FOR FREQUENCY DOMAIN TRANSDUCERS

This invention relates to a circuit for linearizing the outputs of frequency domain transducers which provide a pulsed electrical output signal whose frequency is non-linearly related to the physical variable to which the transducer is responsive. Such transducers are typically density and pressure transducers. Various circuits are known. The output signal can be converted to an analogue voltage which is then linearized by means of a non-linear network. The accuracy of such a circuit is very low. On the other hand very accurate purely digital circuits are available but these are expensive. The object of the present invention is to provide a circuit which combines the virtues of reasonable accuracy and reasonable cost.

According to the present invention there is provided a circuit for linearizing the output of a frequency domain transducer, comprising an oscillator and a counter arranged to count pulses from the oscillator, means responsive to the transducer output signal to reset the counter to a first predetermined value in response to each N'th pulse from the transducer, where N is 1 or another integer, and means for generating a two level switching waveform which changes from one level to the other in response to each said N'th pulse and back to the one level each time the counter assumes a second predetermined value, the circuit further including an analogue network operative upon an input analogue signal to provide an output analogue signal, the network comprising a plurality of switches controlled by the switching waveform such that the gain of the analogue network switches its value as each switch is switched and the arrangement being such that the mean value of the output analogue signal represents a linearized form of the transducer output signal.

The nature of the analogue network and the disposition of the switches therein will naturally depend upon the particular transducer law being linearized but the subsequent description will make clear both the principle upon which the linearization is effected and the adaptability of the invention to different laws. The switching waveform effects mark-space modulation of the analogue signal and in general such modulation must be removed from the output signal by appropriate smoothing. Smoothing may be necessary at intermediate points within the analogue network if, as in two of the examples described below, the switching waveform is used in both its complementary forms. Smoothing time constants should be the shortest consistent with adequate smoothing in order to preserve a rapid dynamic response.

The input analogue signal can be a fixed, reference value, in which case the analogue output signal is linearly proportional to the transduced variable. On the other hand the input signal can be proportional to a second variable, in which case the output signal is proportional to the product of the two variables.

The analogue network can be a passive network with gain always below unity but it is preferred to use an active network based upon operational amplifiers.

The invention will be described in more detail, by way of example, with reference to the accompanying drawings, in which.

Figure 1:
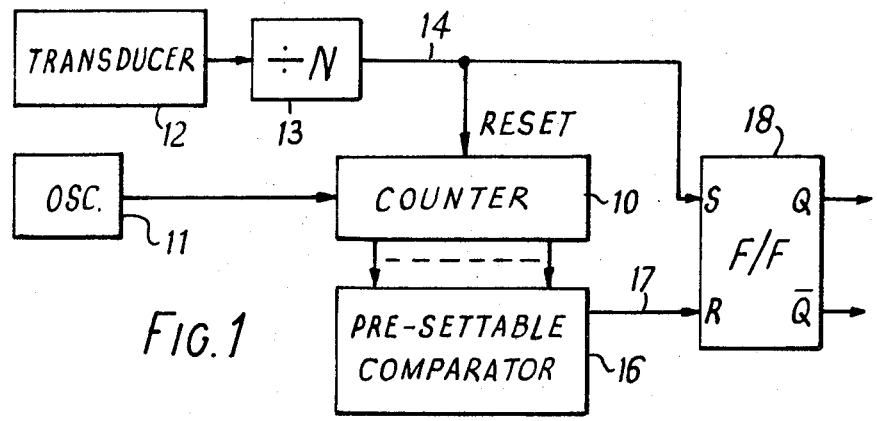
FIGS. 1 and 2 show two circuits for deriving a switching waveform.

In FIG. 1 a counter 10, e.g., a binary or BCD counter, counts clock pulses from a highly stable crystal oscillator 11 whose frequency may be say 10 MHz. A transducer 12 provides pulses at a rate which varies in dependence upon the transduced variable and every N'th pulse is selected by a frequency divider 13 and appears on a line 14. N may be 1, in which case the divider 13 is obviously omitted. The line 14 is connected to a reset terminal of the counter 10 so that every N'th transducer pulse resets the counter to zero, this constituting a first predetermined value.

Considering for the time being the case of $N=1$, it will be appreciated that the counter is reset at intervals of T where T is the period of the transducer pulses. If T is equal to $T_o + \Delta T$, where $T_o$ is a constant, as in the examples set out below, $T_o$ can be marked off following each resetting of the counter to zero by a comparator or equivalence gate 16 which provides a pulse on a line 17 whenever the counter 10 reaches a count of $C_o$ where $C_o \cdot t = T_o$ and $t$ is the period of the oscillator 11. $C_o$ is thus a second predetermined value and the comparator 16 can be settable in known manner to preset different values of $C_o$, and hence of $T_o$.

Figure 3:
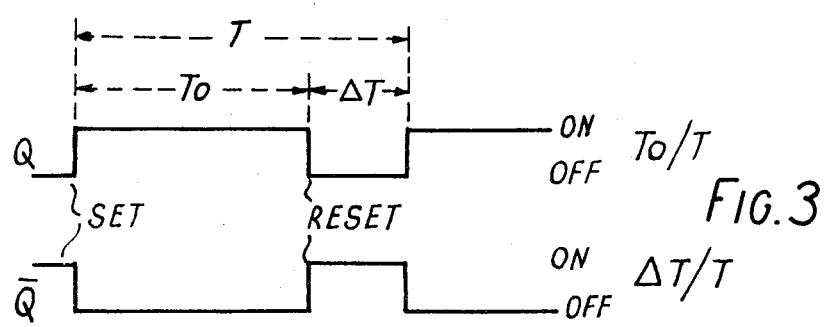
FIG. 3 shows an analogue network.

The lines 14 and 17 are connected to the set and reset inputs S and R respectively of a bistable flip-flop 18 and the waveforms appearing at the corresponding Q and $\bar{Q}$ outputs are as shown in FIG. 3. Either or both of these waveforms can be used as a switching waveform and it will be appreciated that if the ON and OFF states of the switches are assigned as shown in FIG. 3, (the opposite assignment is equally possible), the Q waveform causes a switch to be on for a proportion $T_o/T$ of the time while the $\bar{Q}$ waveform causes a switch to be on for a proportion $\Delta T/T$ of the time.

Figure 2:
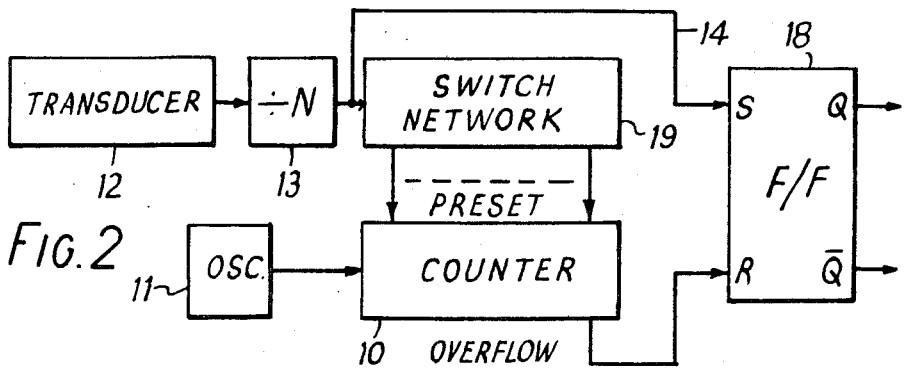

In FIG. 2 essentially the same results are obtained by setting the counter 10 to the complement of $C_o$ (first predetermined value) and simultaneously setting the flip-flop 18 by each pulse on the line 14, a switch network 19 being interposed for presetting $C_o$, while the flip-flop is reset by the overflow pulse from the counter 10 when it passes from full house to zero (second predetermined value).

Liquid density frequency domain transducers are known with a law as follows:

$$\rho = \rho_o[(T/T_o)^2 - 1]$$

where $T$ is the transducer pulse period and $\rho_o$ and $T_o$ are constants for the transducer. This law can be rewritten as:

$$\rho = \rho_o[\Delta T/T_o (1 + T/T_o)]$$

where $\Delta T = T - T_o$, as above.

Figure 4:
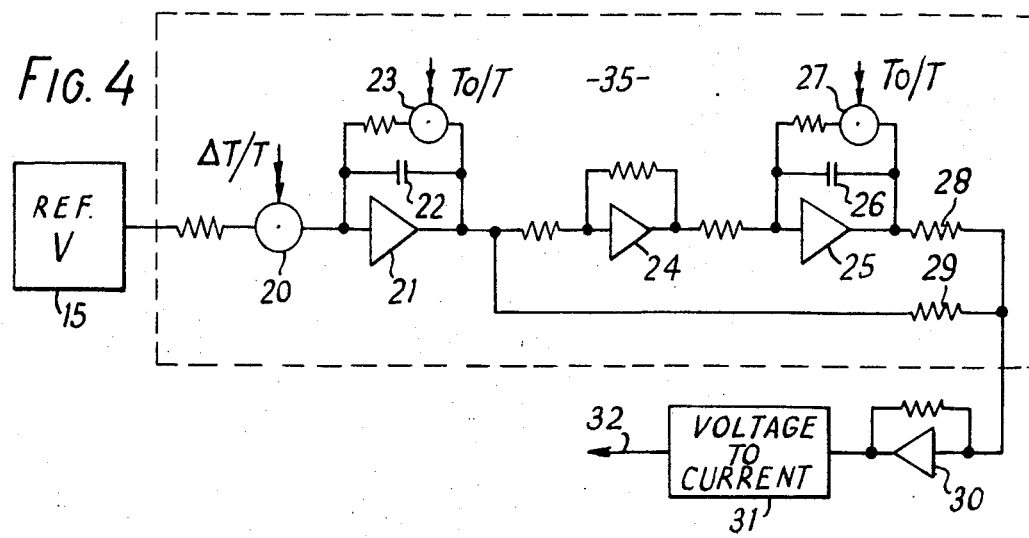
FIG. 4 shows an analogue network.

FIG. 4 shows an analogue network responsive to the switching waveforms identified in accordance with the foregoing as $\Delta T/T$ and $T_o/T$ to provide an analogue output voltage $(V)(\Delta T/T_o)(1 + (T/T_o))$ in response to a reference input voltage $V$ from a circuit 15. Switches are identified by the symbol of a circle with a dot in the center, a double-headed arrow showing the switching input.

The mean output of a switch 20 (controlled by $\Delta T/T$) will be proportional to $\Delta T/T$ and this is applied to an amplifier 21 with a smoothing feedback capacitor 22 and also with a resistive feedback path including a switch 23, controlled by $T_o/T$. The output of the amplifier is thus proportional to $(\Delta T/T)(T_o/T)=\Delta T/T_o$. The latter signal is applied to amplifiers 24 and 25 and the amplifier 25 has a feedback capacitor 26 and a resistive feedback path including a switch 27, controlled by $T_o/T$. The output of the amplifier 25 is proportional to $(\Delta T/T_o) \cdot (T/T_o)$ and this signal is summed with that proportional to $\Delta T/T_o$ by means of equal value resistors 28 and 29 and an amplifier 30 to provide the signal $(V)(\Delta T/TBo)(1+T/T_o)$. This signal can be converted to a corresponding current by a voltage to current converter 31, an output current linearly proportional to density $\rho$ thus being available on a line 32.

The law of a known gas density transducer on the other hand is·

$$\rho = \rho_o[(T/T_o)^2 + T/T_1 - 1]$$

where $T_1$ is another constant. This law can be linearized by the circuit of FIG. 4 simply by altering the relative values of the resistors 28 and 29 so that the input to the amplifier 30 is given by the sum of $\Delta T/T_o \cdot 1 + k$ and $\Delta T/T_o \cdot T/T_o$, where $k/T_o = 1/T_1$. This sum reduces to:

$$(T/T_o) + k(T/T_o - 1) - 1$$
$$= [(T/T_o)^2 + T/T_1 - k] - 1.$$

A small offset $k$ has thus been introduced and can readily be dealt with in any convenient way, e.g. by feeding a compensating constant current into the input of the amplifier 31.

Figure 5:
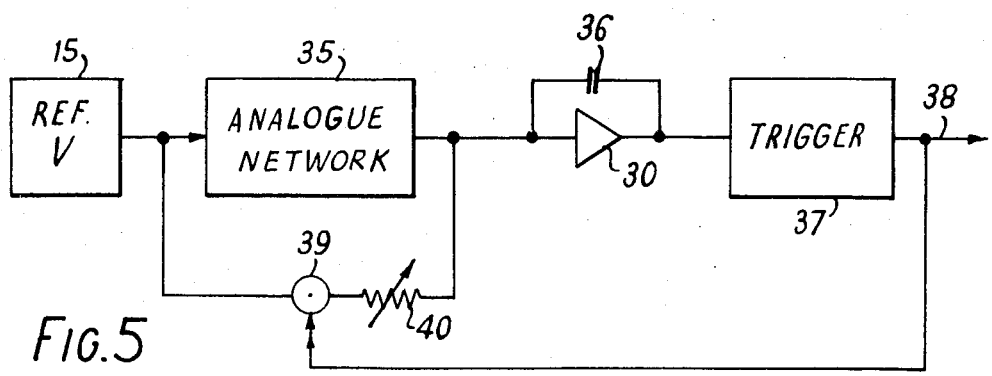
FIGS. 5 and 6 show modifications of FIG. 4.
Figure 6:
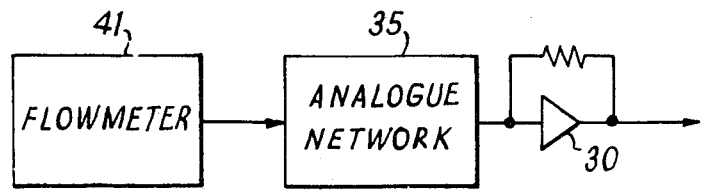

The part of the circuit of FIG. 4 enclosed within a broken line rectangle is indicated by a block 35 in FIGS. 5 and 6, labelled analogue network. In the modification of FIG. 5 the analogue output signal is converted to a mark-space signal which can then be used in known manner to multiply a signal derived from a volumetric flow meter such as a turbine flow meter.

The multiplication is effected by applying pulses derived from the flowmeter to a gate which is operated by the mark space signals on line 38. The number of purses passing through the gate is therefore dependent upon the product of density and volumetric flow and these pulses can be counted or integrated to provide a digital or analogue indication of mass flow.

The amplifier 30 is turned into an integrator by adding a feedback capacitor 36 and the output of this amplifier is applied to a Schmitt trigger circuit 37 which sets when the output of the integrator ramps up sufficiently. The output of the trigger circuit, on line 38, is the mark-space signal and controls a switch 39. When the trigger circuit is set, the switch 39 is ON, i.e. closed and current flows from the reference source 15 through a variable resistor 40 into the amplifier 30 to oppose and outweigh the current from the network 35. The trigger circuit thus resets and cyclic operation is established. The resistor 40 allows the scale factor to be adjusted. This circuit operates independently of the value of $V$.

In FIG. 6 a similar result is obtained by replacing the voltage reference 15 by a flowmeter 41 which produces a voltage proportional to volumetric flow. The output of the network 35 is therefore proportional to mass flow.

The law of a known pressure transducer is
$$P = P_o [(T_o/T)^2 + T_1/T - 1]$$

and it will be noted that $T$ is now in the denominator. This law can be rewritten:
$$P = P_o [\Delta T/T(1 + T_o/T) + k(1 + T_o/T)]$$
where now $\Delta T = T_o - T$.

Figure 7:
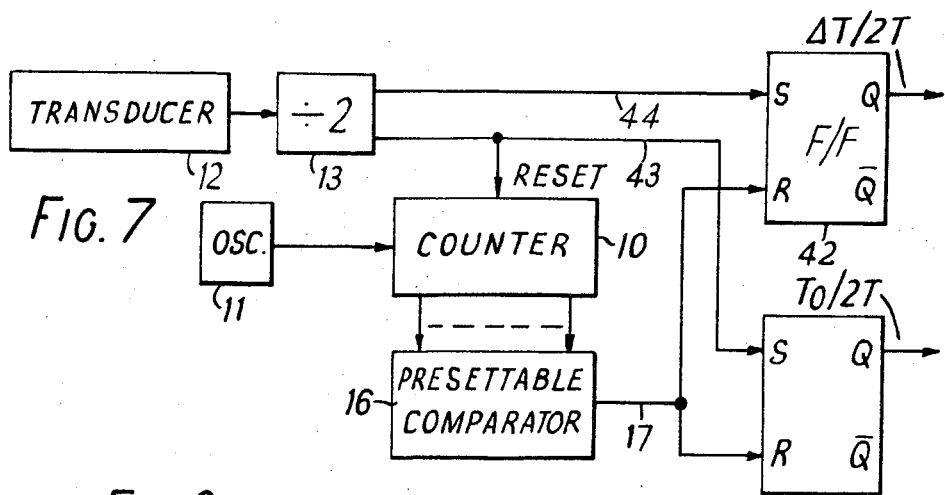
FIG. 7 shows a modification of FIG. 1.
Figure 8:
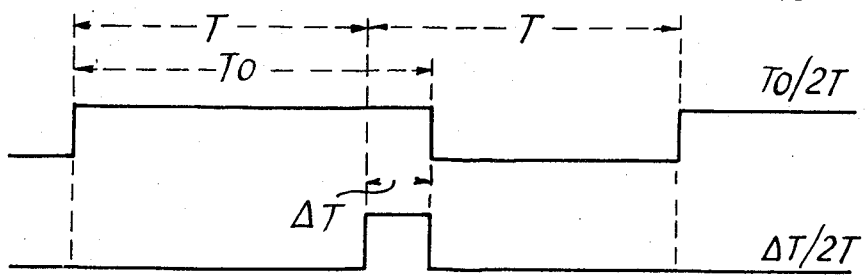
FIG. 8 shows explanatory waveforms.

FIG. 7 shows a modification of FIG. 1 which can be used in this situation, where $T_o$ is greater than T. The frequency divider 13 is here a divide by two circuit and the flip-flop 18 is paralleled by a second flip-flop 42. The two flip-flops are set by antiphase outputs 43 and 44 from the divider 13 and therefore their respective outputs correspond to $\Delta T/2T$ and $T_o/2T$, as shown in FIG. 8.

Figure 9:
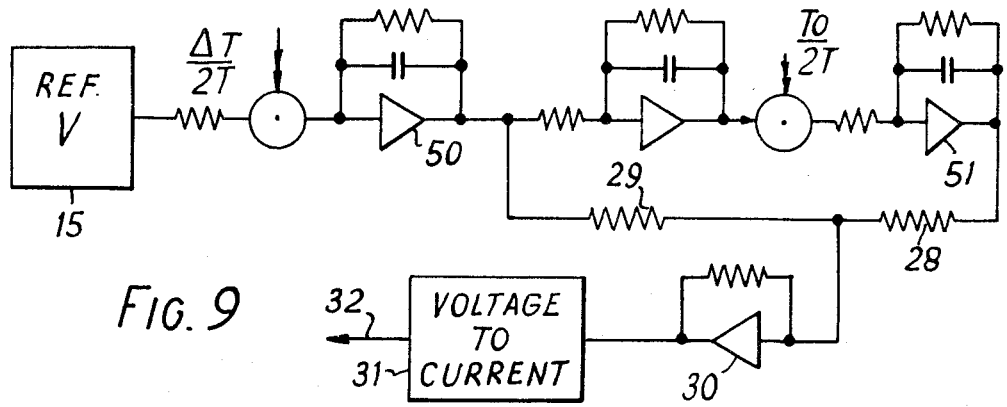
FIG. 9 shows another analogue network.

FIG. 9 shows an analogue network which uses these waveforms to linearize the pressure law. The output of an amplifier 50 is proportional to $\Delta T/2T$ and the output of an amplifier 51 is proportional to $\Delta T/2T - T_o/2T$. With suitable proportioning of the resistors 28 and 29, the output of the amplifier 30 is proportional to
$$\Delta T/2T - (1+k)/2T + \Delta T/2T - T_o/2T$$
which reduces to
$$(T_o/T)^2 + k\,T_o/T - (1+k).$$
If here $kT_o = T_1$ and suitable measures are taken to deal with the constant offset of magnitude $k$ the pressure transducer law is clearly linearized.

I claim:

1. A circuit for linearizing the output of a frequency domain transducer, comprising an oscillator and a counter arranged to count pulses from the oscillator, means responsive to the transducer output signal to reset the counter to a first predetermined value in response to each N'th pulse from the transducer, where N is 1 or another integer, and means for generating a two level switching waveform which changes from one level to the other in response to each said N'th pulse and back to the one level each time the counter assumes a second predetermined value, the circuit further including a source of an analogue signal and an analogue network operative upon the analogue signal to provide an output analogue signal, the network comprising a plurality of switches controlled by the switching waveform such that the gain of the analogue network switches its value as each switch is switched and the arrangement being such that the mean value of the output analogue signal represents a linearized form of the transducer output signal.

2. A linearizing circuit according to claim 1, wherein said switching waveform and the complement thereof are generated and control different switches in the analogue network.

3. A linearizing circuit according to claim 1, wherein N is 2 or a multiple thereof and the said generating means generate two switching waveforms of which one changes to its other level every N'th pulse while the second changes to its other level every intervening N'th pulse, both waveforms changing back to their one levels each time the counter assumes the second predetermined value, the two switching waveforms controlling different switches in the analogue network.

4. A linearizing circuit to claim 1 wherein said analogue network includes at least one chopper switch.

5. A linearizing circuit according to claim 1 wherein said analogue network includes at least one integrator and a switch for discharging the integrator.

6. A linearizing circuit according to claim 1 wherein said input analogue signal is a fixed reference value.

7. A linearizing circuit according to claim 6 and including means for converting the output analogue signal to a markspace signal.

8. A linearizing circuit according to claim 7 wherein said means for converting comprises an integrator for integrating the output analogue signal, a trigger circuit responsive to the arrival of the output of the integrator at a predetermined level to enter a SET state for feeding a further signal into the integrator in opposition to the output analogue signal so long as the trigger circuit is SET to cause the trigger circuit to reset, the further signal being derived from the said fixed reference value signal.

9. A linearizing circuit according to claim 1 wherein said input analogue signal is proportional to a second variable.

10. A linearizing circuit according to claim 9, wherein said transducer is a density transducer and the input analogue signal is derived from a flowmeter.

11. A linearizing circuit according to claim 7, further comprising a gate controlled by the mark space signal and a flowmeter feeding pulses whose rate is proportional to volumetric flow rate to the gate to be passed thereby when the gate is enabled by the mark space signal.

* * * * *

PO-1050
(5/69)

UNITED STATES PATENT OFFICE
CERTIFICATE OF CORRECTION

Patent No. 3,700,865        Dated October 24, 1972

Inventor(s)    Anthony John Ley

It is certified that error appears in the above-identified patent and that said Letters Patent are hereby corrected as shown below:

IN THE ABSTRACT:

Line 4, delete "N'the" and insert therefor -- N'th --.

IN THE SPECIFICATION:

Column 2, line 1, delete "an analogue network" and insert therefor -- explanatory waveforms --.

Column 3, line 4, delete "$(\Delta T/T)(T_o/T)$" and insert therefor -- $(\Delta T/T) \div (T_o T)$ --.

Column 3, line 12, delete "$(\Delta T/T B_o)$ and insert therefor -- $(T/T_o)$ --.

Column 3, line 26, delete "$(T/T_o)$ and insert therefor -- $(T/T_o)^2$ --.

Column 3, line 43, delete "purses" and insert therefor -- pulses --.

Column 3, line 66, after "is" insert -- : --.

Column 4, line 19, after "(1 + k)/2" delete "T".

IN THE CLAIMS:

Claim 4, line 1, after "circuit" insert -- according --.

Signed and sealed this 1st day of July 1975.

(SEAL)
Attest:

RUTH C. MASON        C. MARSHALL DANN
Attesting Officer     Commissioner of Patents
                                 and Trademarks